June 19, 1951      B. A. UTTER      2,557,707
CONVEYER AND SUPPORT FOR USE IN PROCESSING POULTRY
Filed March 13, 1945      2 Sheets—Sheet 1
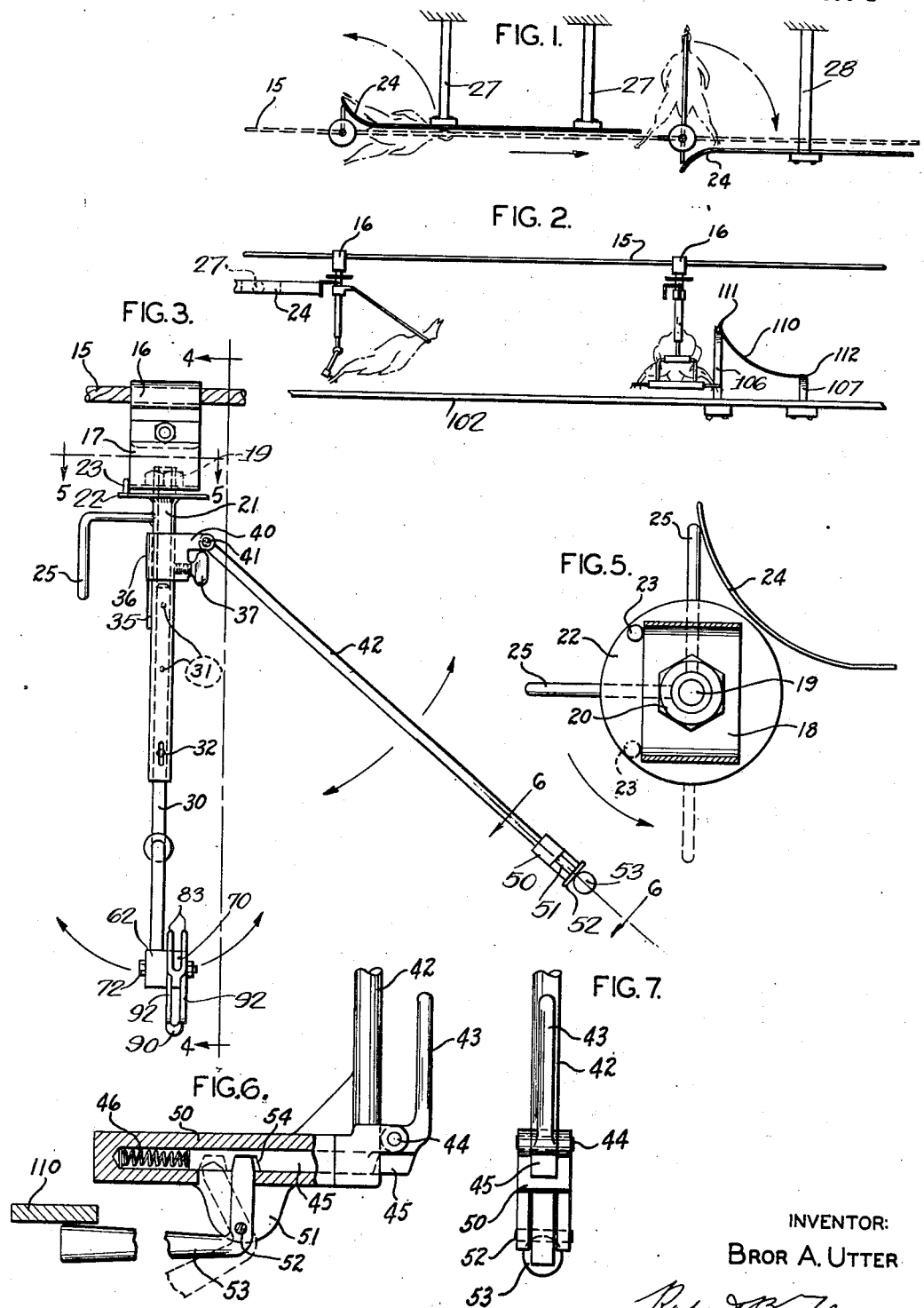
INVENTOR:
BROR A. UTTER
BY Robert B. Terry
ATTORNEY

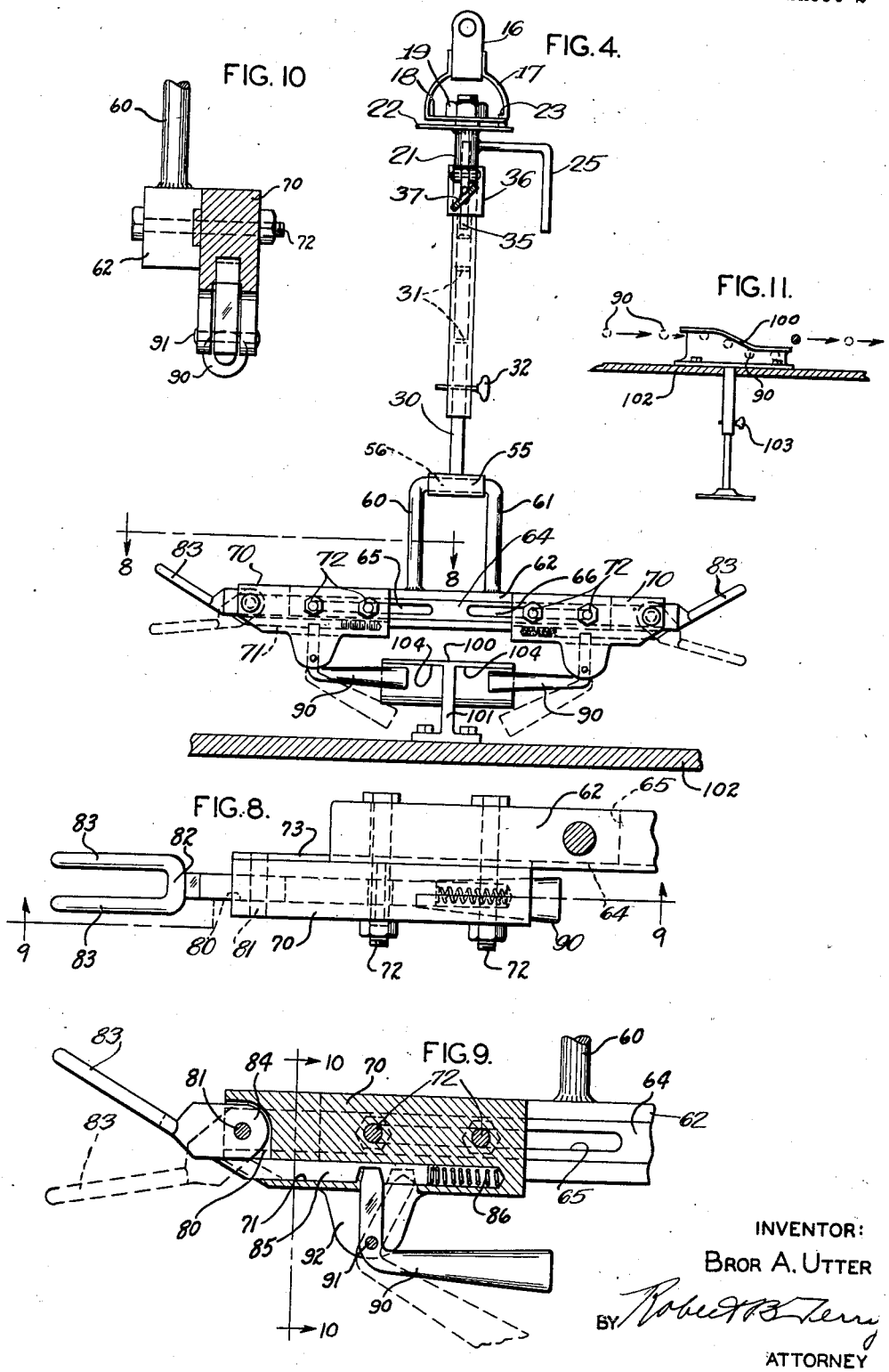

Patented June 19, 1951

2,557,707

UNITED STATES PATENT OFFICE 2,557,707

CONVEYER AND SUPPORT FOR USE IN PROCESSING POULTRY

Bror A. Utter, Overland, Mo.

Application March 13, 1945, Serial No. 582,497

5 Claims. (Cl. 17—44.1)

1

This invention relates to a support or shackle assembly for use in processing poultry, and more particularly to improved means for supporting a fowl while in process of cleaning, evisceration, singeing and the like, all, by preference, in combination with a power conveyor enabling the various steps of processing to be conducted, each at a predetermined station and with appropriate adjunctive equipment therefor.

This applicant, based on a great number of years experience in observation, inspection, and other duties in connection with the mass processing of poultry, has observed that practically altogether such processing has heretofore been prevalently characterized by a distinct lack of standardization, resulting in needlessly high costs for processing poultry in quantity, and that, as an incident to these shortcomings of present processing plants, the work of cleaning and evisceration, as well as packing poultry, is often conducted under makeshift, unsanitary conditions. It is accordingly a general object of the present invention, to standardize, and thereby conduce to thoroughness of the several work operations involved in the processing of fowl of all kinds for human food consumption.

Yet another object of the invention is attained in an improved design of supporting and holding apparatus for fowl of various kinds while being processed; the invention in its broader aspects contemplates a device for the purposes noted, which, through various adjustments, presents the fowl and all parts thereof, at an optimum angle and in the best position for most favorable and quickest work operations thereon, in fact such that practically all of the cleaning, evisceration, roughing (defeathering) and similar steps may be thoroughly and successfully accomplished under sanitary conditions while the bird is in motion through and between the several work stations arranged along a conveyor route.

Yet another and important objective of the invention is attained in improved shackle adjustment provisions such that the device may readily and quickly be accommodated to fowls of all sizes encountered in trade, from the smaller so-called broilers to the largest turkey appearing in the market.

Still another objective of importance is attained in the provision of fully independently adjustable leg and neck shackles located on a common support frame such that the distance relation between any two of the shackles may be varied as described.

An additional objective of the invention is attained in an improved arrangement for automatic action, as a traveling poultry-supporting frame traverses or encounters a given work station, of releasing the shackles which retain the fowl in a work position, thus providing automatic unloading means for a poultry holder of the general type in present contemplation.

Yet another and very important objective of the present subject is attained in a poultry supporting frame or shackle assembly in combination with a traveling support or conveyor, such that during movement of the support by the conveyor, the angular position of the support and work is accurately controlled, and is angularly fixed and maintained for a time in fixed relation to the operator and to the line of conveyor travel throughout any portion of the conveyor path desired, as in a given work station or stations.

The foregoing and numerous other objects will more clearly appear from the following detailed description of a presently preferred embodiment of the invention, particularly when considered in connection with the accompanying drawing, in which:

Fig. 1 is a top or plan view of a portion of a conveyor with fowl supports thereon, moving in the direction indicated by the arrow and illustrating particularly certain of the elements whereby the angular position of the supporting frame is or may be fixed for a time, and subsequently varied, in predetermined portions of the conveyor path;

Fig. 2 is a side view of a conveyor, with the fowl-supporting frames thereon, Figs. 2 and 3 being somewhat diagrammatic in nature;

Fig. 3 is a side elevation of a frame and shackle assembly;

Fig. 4 is a front elevation of the frame assembly, but with a pivoted neck holder omitted for clearness, and as viewed along line 4—4 of Fig. 3;

Fig. 5 is an enlarged fragmentary top view, as taken along line 5—5 of Fig. 3 and illustrating the coaction with the frame of one of the angle control cams along the conveyor path;

Figs. 6 and 7 are enlarged side and front elevations, respectively taken at right angles to each other, Fig. 6 being related to Fig. 3 as viewed along line 6—6 thereof;

Fig. 8 is a top view, somewhat enlarged, of a portion of the shackle bar, one of the leg shackles and the shackle actuating assembly as viewed along line 8—8 of Fig. 4;

Fig. 9 is a front elevation of the assembly shown by Fig. 8 and as viewed along line 9—9 thereof;

Fig. 10 is a fragmentary sectional elevation taken through one of the leg shackle assemblies along the plane indicated by line 10—10 of Fig. 9;

Fig. 11 is a side elevation, somewhat diagrammatic, showing further structure of one type of stationary cam and its support, for tripping or releasing the leg shackle assemblies of the device at a predetermined station along the conveyor route, this showing being at a zone along the path of movement of the conveyor shown in Fig. 2, and Referring now by characters of reference to the drawing, the example selected for typical present embodiment, includes a power driven conveyor 15 which may consist of a steel cable or if desired, a conveyor of any other suitable form such as an articular structure which may consist of a chain or the like. Secured at spaced intervals along the traveling conveyor 15, which is powered by suitable means (not shown), are a plurality of cable clamps 16 suspended from each of which is a U-shaped frame 17, the bottom 18 of which is shown as arranged in a horizontal plane and suitably apertured (not shown), for the reception of a threaded rod 19 which receives an assembly nut 20. The rod 19 constitutes an upward extension of a tube 21 being secured thereto as by welding, and at or near the outer end of tube 21 is a plate element 22, shown as circular and provided with an upwardly projecting stop pin 23. It will now have appeared that the connection between tube 21 and the U-shaped member 17 is pivotal, and that the tube may swing about its normally vertical axis within limits defined by the full and dotted positions of pin 23. As will best appear from Fig. 5, the pin serves as a stop element in its engagement with the support 17, permitting a swing of the tube 21 and parts supported thereby, in the example shown, through the quarter turn, or 90 degrees.

In order to accomplish this quarter turn rotation in predetermined zones along the conveyor path, there are provided on either side and in some cases on opposite sides of the conveyor 15, stationary cams best appearing in Figs. 1 and 5 and indicated at 24. Each of the cams 24 may be conveniently supported by one or more brackets of the general character shown at 27 and 28 in Fig. 1 which is a simple and convenient means for supporting cam structures. As followers coacting with the cams 24, the tube or column element 21 is provided with two cam follower arms of inverted L-shape in form and indicated at 25. The manner of engagement of the followers 25 with stationary cams 24 will best appear from Fig. 5. It will now be apparent, particularly from Figs. 1 and 2, that as is most desirable in the several work stations along the conveyor route, the frame and hence the fowl carried thereon, may be swung through 90 degrees in order to present the work at the best angle to the operator, depending upon the nature of the work and the adjunctive equipment required.

Proceeding now to a further description of the shackle frame and its elements, it will appear in Figs. 3 and 4 that the tubular column 21 telescopically receives a column rod 30, and that the latter is provided with a series of spaced diametral openings 31 arranged to be engaged by an adjustment pin or screw 32 carried in the tubular column. Upon temporary removal of pin 32 from any opening 31, the rod 30 is rendered free to be moved relative to the tubular column 21 and, hence may be selectively extended or retracted, thus adjusting the height of frame to dispose the work at the best height for the operator, considering the type and size of fowl in work.

The column piece 21 is provided with an external, longitudinally extending rib 35 which engages a longitudinal slot (not shown), with only requisite working clearance, formed along and internally of a bore in a tubular sleeve member 36, the diameter of bore of member 36 being such as to provide a working clearance with the tubular member 21 extending through the bore. The sleeve may be selectively positioned at different heights along tube 21 through the provision of a clamp screw 37. The member 36 carries a projection 40 horizontally drilled to receive a pivot pin 41 extending also through a rod 42 for supporting the neck shackle of the bird, as will appear. The relation of rod 42 to member 36, hence to the vertical columnar elements of the frame, is such that rod 42 is free to swing at all times in a vertical plane. This provision is made in order that, since rod 42 carries the neck shackle, the fowl in process will definitely be bodily moved as the frame and column are angularly shifted under the influence of cams 24.

At the extremity of the neck supporting rod 42 is carried the neck shackle, consisting essentially of the U-shaped shackle proper 43 which, through a horizontal pivot pin 44, is connected to the rod 42. In operative position the shackle 43 is retained with its outer leg parallel to rod 42 through a latch or bolt member 45, the latter being normally biased to hold the shackle 43 in operative position, through a compression spring 46. As will appear, the latch or bolt 45 and the spring 46 are contained within a bolt block 50, depending from which is an integral projection 51 carrying a pivot pin 52 for a bellcrank lever 53, the short end of which extends into a notch 54 in the bolt or latch 45. Thus upon downward (in the drawing) actuation of the lever 53, bolt or latch 45 will be retracted, the shackle 43 deprived of its support and the weight of the neck of the fowl therein will at once release the shackle and discharge this extremity of the bird from support by the shackle, hence by the frame.

The leg shackle portions of the frame, best observed in Figs. 4, 8 and 9, include a tubular formation in the nature of a bearing sleeve indicated at 55, which serves swingably to receive the bight or bridge portion 56 of an inverted U-shaped yoke, the legs 60 and 61 of which are secured as by welding to the intermediate portion of the shackle bar 62. The shackle bar preferably is of square or rectangular section and is provided on its front or one of its vertical faces, with a horizontal slot or groove 64, and further provided over a substantial portion of its length with slotted apertures 65 and 66. The leg shackle assemblies are preferably, and as shown, formed right and left handed, but being otherwise identical, a description of one will suffice for both. Each includes, somewhat similarly to the neck shackle, a bolt block 70 provided with a longitudinal boltway 71. Each block 70 is provided with one or a plurality of attachment bolt openings for the reception of bolts 72 which, it will be noted, also extend through one of the slotted openings 65 and 66 of the shackle bar. Each block 70 is provided along a vertical face adjacent the bar 62, with a rib 73 interfitting the slot 64. Obviously now, upon release of the nuts on bolt 72, the latter together with associated bolt block 70 may be moved to the right or left along bar 62, hence providing for a considerable lattitude of distance adjustment between the companion right and left leg shackles, to be later described.

Each of the bolt blocks 70 is provided with an end recess 80, bridging it and carried in suitable apertures is a shackle pivot pin 81. Each leg shackle, indicated generally at 82, is bifurcate in structure including besides its legs 83, a pivot extension 84 apertured to receive the pin 81.

It will have been observed that the recess 80 is open at the bottom, and further observed that the shackle proper 83—83 extends upwardly of the horizontal at substantially an acute angle, by preference but without restriction, say 30 degrees. The purpose of this will now be obvious to those skilled in the art, in that, with the leg of a fowl seated in the shackle and between the shackle arms 83, that part of the weight of the fowl imposed on the leg received thereby will thus normally tend to seat the leg and foot more deeply into the shackle. It will now be obvious from a comparison of the full line and dotted positions of the shackle (Fig. 9) that unless supported, the shackle will, when loaded, assume by gravity an unloading position in which the shackle arms are disposed below the horizontal and with a distinct downward and outward slope. Retention of the shackle in its load-receiving position is provided for by a bolt or latch 85 which is reciprocable for purposes of unloading or releasing the shackle and of restoring it to load-receiving position. The latch or bolt 85 is normally biased in a direction outwardly of the block 70 to support the shackle in loaded position under the influence of a coil compression spring 86 which occupies the closed end of the boltway 71. Retraction of the latch when desired is provided for by a bellcrank or dogleg lever 90, which may be moved between full line and dotted position (Fig. 9) about a pivot 91 extending through the lever and through an integral projection 92 depending from the bolt block 70.

Provision for the automatic camming actuation, severally or collectively as desired, of the several shackle unloading means, is currently shown as consisting, for control of the leg shackles, of a stationary cam 100. This is centrally supported by a web 101 and derives its primary support from a table portion 102 which is in the path of movement of the conveyor, but out of the view of the conveyor shown in Fig. 2. Since due to the columnar adjustment of the frame heretofore described, the actual height of the leg shackles will vary, provision for a corresponding height adjustment in cam 100 is made by a vertical adjustment of the table portion 102 by means indicated generally at 103, and which may be similar to the adjustment 31—32. It will be noted in Figs. 4 and 11 particularly that the cam 100 presents an active under surface 104 on each side of its central support or web 101, which with proper prefixed adjustment of table 102 will, as the conveyor approaches a shackle unloading station along its route, cause the handles 90 to be brought just beneath and gradually into engagement with the camming surfaces 104 of cam 100. Thus as these handles, now considered as cam followers, are depressed, due to continued forward motion of the conveyor in the direction of the arrows (Fig. 11) the shackles 82 will, because of withdrawal of latches or bolts 85, be dropped to permit discharge of the feet of the fowl by gravity to a table or receptacle beneath the shackle frame.

The unloading of the neck shackle may be cared for manually if desired, but a satisfactory mechanical unloading cam consists of a stationary element 110, diagrammatically indicated in Fig. 2. This is suitably supported from any overhead or subjacent structure, the latter structure being shown in Fig. 2 as comprising brackets 106 and 107 attached to table 102, and is curved from a bracket attachment point 111 downwardly to a bracket attachment point 112 so that, irrespective of the differing heights of the neck shackle as determined by the varying angularity of rod 42, as the conveyor moves between points 111 and 112, there will be an engagement of the under surface of cam 110 by the actuating lever 53. It is necessary in this form of automatic control for the neck shackle, that the cam 110 be located laterally beyond the path of the conveyor so as not to obstruct its continued movement through and beyond the neck shackle unloading zone and accordingly the brackets 106 and 107 are mounted at one longitudinal side of table 102 which is a conventional means for positioning said brackets. It may be noted as advisable for unloading the neck shackle, first to swing, as by one of the cams 24, the shackle frame about its vertical axis so as to bring the body of the bird generally crosswise of the conveyor line.

For the most part, the purposes and manner of utilization of the various elements of the assembly, as well as the general objectives and operative relations of the parts, have heretofore been described, so that the function as a whole is thought now to be apparent. It may be noted, however, that as the fowl is transported through the various work stations incident to a complete processing thereof from time of killing and bleeding through to the end point of the process, incident to such steps as require the fowl to be put on the conveyor, the legs thereof are inserted in the leg shackles with the latter in their work-receiving positions as shown by full lines, (Figs. 4 and 9), and with the neck shackle in operative position rod 42 is moved outwardly according to size of bird, so that the neck of the fowl may quickly be inserted in the neck shackle. Now, obviously, according to size of fowl, this will require some variation in the angular position of the rod 42 to the columnar portions of the frame. For larger birds, it is also obvious that the horizontal space relation between the leg shackles will need to be increased as may readily be done by backing off the nuts on the bolts 72, appropriately spacing the blocks 70, and again taking up on the nuts. The width of cam 100 is, it may be noted, sufficient to actuate the cam followers or handles 90 in any possible adjustment of the blocks 70. The fowl is loaded on the carrier and presented breast uppermost for the most of the cleaning processes, cropping, etc., and is transported from station to station so that it undergoes the predetermined series of work operations. When it is desired to release the fowl from the frame and shackles, cams 104 acting on follower handles 90 will serve to unload the leg shackles and cam 110, acting on the neck shackle, will cause the discharge of the fowl by gravity from the frame.

It may be noted as desirable in certain of the work stations along the conveyor route, to provide for raising or lowering of the shackle frame as for example, to bring the bird into, through and again out of a scalding vat and again for example as may be desired, to raise and lower the frame, hence the fowl thereon incident to singeing operations. Such raising and lowering is conveniently cared for by vertical modifications of the conveyor cable supports, so that, as cable 15 traverses such stations, automatic upward and downward motion is imparted to the shackle frame and the fowl.

Although the invention has been described by making specific reference to certain of the elements and associated structure, the detail of description is to be understood solely in an instructive, rather than in any limiting sense, numerous variants being possible within the scope of the invention as defined by the claims hereunto appended.

I claim as my invention:

1. In a poultry shackle assembly constituting a work holder for fowl or the like, a frame supported by the work holder, shackle body adjustably positioned on the frame, and elongate U-shaped shackle pivoted to said body, a latch slidably movable substantially horizontally along the body and normally positioned adjacent the shackle so as to position the shackle in an operative or work-receiving relation, a spring in biasing relation to the latch, and a releasing element for the latch, pivoted to the body, and adapted for pivotal movement to enable retraction of the latch against the loading of the latch spring, and consequent pivotal movement of the shackle from a work-holding to a work-releasing position.

2. In a poultry shackle assembly of traveling type, a movable conveyor, a shackle frame pivotally and dependingly supported by the conveyor, two leg shackles and a neck shackle pivotally supported by the frame, a spring biased latch operatively connected with each of said shackles, and serving normally to prevent pivotal movement of each shackle to the inoperative position from an operative fowl-supporting position, and stationary cam means located along the path of the conveyor and adapted to be engaged by each shackle latch structure to permit pivotal movement of each shackle at a predetermined station along the conveyor path.

3. In a traveling poultry holder for supporting fowl during work processes thereon, an overhead conveyor arranged for movement along a predetermined linear path, a frame provided with an upper pivot connection to the conveyor for permitting frame rotation about a vertical axis, stop elements associated with the pivot connection for limiting the range of rotative movement of the frame about its pivot axis, a column including a two-part telescoping structure normally vertically disposed, a horizontal bearing sleeve at the lower end of the column structure, an inverted U-shaped yoke, the bridge of which extends through and is journalled in said bearing sleeve, a shackle bar secured to the ends of the legs of the U-shaped structure, the shackle bar being slotted longitudinally over a substantial portion of its length, and the bar being provided along one face with a longitudinal groove, a pair of shackle blocks, one or more supporting bolts extending through the shackle blocks and through the slotted portions of the shackle bar, each block provided with a longitudinal rib on a face adjacent the grooved face of the shackle bar, a shackle pivotally carried by each shackle block, a spring pressed latch normally positioned to retain the associated shackle with its ends upwardly directed at an acute angle to the horizontal, a latch operating extension projecting outwardly of each shackle block, an operating arm carried by and projecting laterally of the column for swinging the column and the frame about its pivot axis, and stationary cam elements positioned along the path of the conveyor and adapted at predetermined stations along said path, for engagement with the column operating arm to swing the frame through a predetermined angle about its vertical axis, and for engagement with the shackle latch operating projections, for tripping the latches and releasing the shackles at predetermined stations along the conveyor path.

4. In a poultry shackle assembly, a frame, a column pivotally connected to said frame for movement about a vertical axis, bar means connected to said column for swinging movement about a horizontal axis, adjustable block elements carried by said bar means in spaced relation, a shackle pivotally connected to each block element, spring biased latch means on said block elements for normally causing said shackles to assume upwardly inclined positions for the support of the extremities of a fowl, and latch operating means movable to retract said latch means for permitting downwardly inclined pivoting movement of said shackles under the weight of a fowl, whereby to release the fowl from the shackle assembly.

5. In a poultry shackle assembly, a frame, a column pivotally connected to said frame for movement about a vertical axis, bar means connected to said column for swinging movement about a horizontal axis, a pair of block elements spaced apart and adjustably secured to said bar, a shackle pivotally connected to each block element and movable therewith for variations in the spacing of the shackles, spring biased latch means on each block normally movable to cause said shackles to pivot to upwardly inclined position to support the leg extremities of a fowl, latch operating means associated with said latch means to retract the latter for permitting downward pivoting movement of said shackles under the weight of a fowl, a sleeve adjustably carried on said column for movement to and from said swingable bar means, a rod pivotally carried by said sleeve, a shackle for the neck of a fowl pivotally carried at the free end of said rod, and spring biased latch means acting on said neck shackle to effect its pivotal movement to a position of support, the last mentioned latch means being actuable to release said neck shackle for pivotal movement to release the fowl.

BROR A. UTTER.

REFERENCES CITED

The following references are of record in the file of this patent:

UNITED STATES PATENTS

| Number | Name | Date |
|---|---|---|
| Re. 22,323 | McMahan et al. | May 25, 1943 |
| 928,172 | Bernardin | July 13, 1909 |
| 2,047,544 | Bruce | July 14, 1936 |
| 2,124,691 | De Vout | July 26, 1938 |
| 2,129,968 | Sargent | Sept. 13, 1938 |
| 2,331,566 | Pautz | Oct. 12, 1943 |
| 2,423,560 | Jasper | July 8, 1947 |
| 2,435,706 | Barker | Feb. 10, 1948 |
| 2,438,608 | Johnson | Mar. 30, 1948 |